(12) United States Patent
Hessler et al.

(10) Patent No.: US 10,141,988 B1
(45) Date of Patent: Nov. 27, 2018

(54) METHOD AND FIRST RADIO NODE FOR COMMUNICATING DATA USING PRECODERS

(71) Applicant: Telefonaktiebolaget LM Ericsson (publ), Stockholm (SE)

(72) Inventors: Martin Hessler, Linköping (SE); Pål Frenger, Linköping (SE); Jonas Fröberg Olsson, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/554,617

(22) PCT Filed: Jun. 28, 2017

(86) PCT No.: PCT/SE2017/050712
§ 371 (c)(1),
(2) Date: Aug. 30, 2017

(51) Int. Cl.
*H04B 7/0456* (2017.01)
*H04B 7/06* (2006.01)
*H04B 7/0413* (2017.01)

(52) U.S. Cl.
CPC ......... *H04B 7/0456* (2013.01); *H04B 7/0626* (2013.01); *H04B 7/0413* (2013.01)

(58) Field of Classification Search
CPC .. H04B 7/0456; H04B 7/0417; H04B 7/0478; H04B 7/0626; H04B 7/0413
USPC ................................... 375/260, 26
See application file for complete search history.

(56) References Cited

U.S. PATENT DOCUMENTS

| 8,130,862 | B2* | 3/2012 | Forenza | H04B 7/022 375/295 |
| 8,514,836 | B2 | 8/2013 | Frenger et al. | |
| 2004/0233981 | A1* | 11/2004 | Porter | H04L 25/03343 375/229 |
| 2010/0284484 | A1* | 11/2010 | Jongren | H04B 7/0639 375/267 |
| 2011/0038300 | A1* | 2/2011 | Moulsley | H04B 7/0452 370/312 |
| 2011/0096755 | A1* | 4/2011 | Clerckx | H04B 7/043 370/335 |

(Continued)

OTHER PUBLICATIONS

Unknown, Author, "Codebook based transmission for UL MIMO", Huawei, HiSilicon, 3GPP TSG RAN WG1 NR Ad Hoc Meeting, R1-1710447, Qingdao, China, Jun. 27-30, 2017, 1-9.

(Continued)

*Primary Examiner* — Emmanuel Bayard
(74) *Attorney, Agent, or Firm* — Murphy, Bilak & Homiller, PLLC

(57) ABSTRACT

A method and a first radio node (200 or 202), for communicating data with a second radio node in a wireless network using precoders. The first radio node (200 or 202) communicates (2:1) with the second radio node (202 or 200) a first data transmission using a first set of precoders (S1), and communicates (2:4) with the second radio node (202 or 200) a precoder indicator which is based on quality of the communicated first data transmission. The first radio node (200 or 202) identifies (2:5) a second set of precoders (S2) within the first set (S1) based on the communicated precoder indicator, and communicates (2:6) with the second radio node (202 or 200) a second data transmission using the second set of precoders.

27 Claims, 10 Drawing Sheets

(56) References Cited

U.S. PATENT DOCUMENTS

| | | | | |
|---|---|---|---|---|
| 2011/0248889 A1* | 10/2011 | Lindgren | ............. | H04B 7/0417 |
| | | | | 342/373 |
| 2011/0249713 A1* | 10/2011 | Hammarwall | ....... | H04B 7/0634 |
| | | | | 375/220 |
| 2011/0263281 A1* | 10/2011 | Cai | ...................... | H04B 7/0404 |
| | | | | 455/501 |
| 2012/0002612 A1* | 1/2012 | Baker | .................. | H04B 7/0417 |
| | | | | 370/328 |
| 2012/0009917 A1* | 1/2012 | Baker | .................. | H04B 7/0665 |
| | | | | 455/422.1 |
| 2013/0163530 A1* | 6/2013 | Chen | ...................... | H04W 72/04 |
| | | | | 370/329 |
| 2013/0272263 A1 | 10/2013 | Pi et al. | | |
| 2014/0029689 A1* | 1/2014 | Liu | ...................... | H04B 7/0486 |
| | | | | 375/267 |
| 2014/0044209 A1* | 2/2014 | Moulsley | ............... | H04B 7/024 |
| | | | | 375/267 |
| 2015/0030096 A1* | 1/2015 | Lee | ...................... | H04B 7/0486 |
| | | | | 375/267 |
| 2017/0257868 A1* | 9/2017 | Wang | ................ | H04W 72/0466 |
| 2018/0049173 A1* | 2/2018 | Chen | ...................... | H04W 76/28 |
| 2018/0054285 A1* | 2/2018 | Chen | .................... | H04B 7/0628 |

OTHER PUBLICATIONS

Unknown, Author, "Discussion on DL beam management", LG Electronics, 3GPP TSG RAN WG1 NR Ad-Hoc#2, R1-1710281, Qingdao, P.R. China, Jun. 27-30, 2017, 1-5.

Unknown, Author, "Preliminary system-level performance of hierarchical codebooks", Alcatel-Lucent, Alcatel-Lucent Shanghai Bell, 3GPP TSG RAN WG1 Meeting #60, Tdoc R1-100927, San Francisco, USA, Feb. 22-26, 2010, 1-6.

Zhenyu, Xiao, "Hierarchical Codebook Design for Beamfonning Training in Millimeter-Wave Communication", IEEE Transactions on Wireless Communications, vol. 15 No. 5, Jan. 18, 2016, 1-13.

* cited by examiner

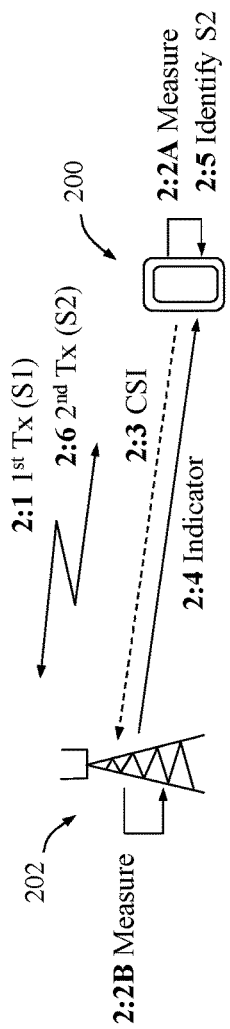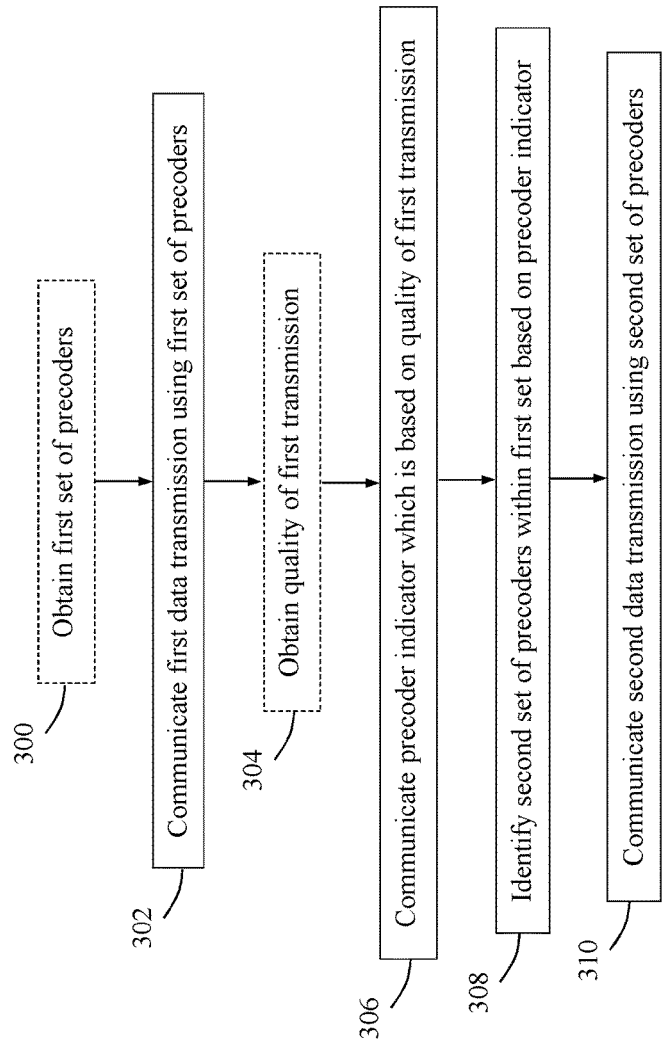

| Tree navigation bits | Description |
|---|---|
| 00 | Stay at current node in pre-coder set tree |
| 01 | Go to parent node |
| 10 | Go to first child node |
| 11 | Go to second child node |

Fig. 6

METHOD AND FIRST RADIO NODE FOR COMMUNICATING DATA USING PRECODERS

TECHNICAL FIELD

The present disclosure relates generally to a method and a first radio node, for communicating data with a second radio node in a wireless network using precoders.

BACKGROUND

In this disclosure, the term "wireless device" is used to represent a communication entity capable of radio communication with a wireless network by sending and receiving radio signals. The wireless device described herein may, without limitation, be any of a mobile telephone, a tablet, a laptop computer and a Machine-to-Machine, M2M, device, also known as Machine Type Communication, MTC, device. Another common generic term in this field is "User Equipment, UE" which may be used herein as a synonym for wireless device.

Further, the term "network node", is used herein to represent any node of a wireless network that is operative to communicate radio signals with wireless devices. The network node in this disclosure may refer to a base station, radio node, Node B, eNB, base transceiver station, access point, etc., although this disclosure is not limited to these examples either. The network node in this disclosure may also be a Radio Network Controller, RNC, or similar that controls one or more base stations or radio nodes that communicate radio signals with wireless devices. The term "base station" may be used herein as a synonym for network node.

Also, the term "radio node" used herein may represent a wireless device or a network node.

Beamforming is likely to become an important technology in future radio communication systems. Multiple antennas can be used for both transmission and reception, referred to as Multiple-Input-Multiple-Output, MIMO, which enables the use of precoders to accomplish beamforming. Beamforming may improve performance in a wireless network, by increasing the received signal strength, thereby improving the coverage, and by reducing unwanted interference, thereby improving the capacity. Beamforming can be applied both in a signal transmitting node, referred to as a transmitter, and a signal receiving node, referred to as a receiver. In a transmitter, beamforming amounts to configuring the transmitter to transmit the signal in a specific direction and not in other directions. This can be achieved by applying a specific precoder to the transmission. By knowing which precoder has been used in the transmission, the receiver is able to apply the same precoder when receiving the transmission.

Different precoders thus produce different beam directions and there are a number of predefined precoders to choose from when selecting which precoder is best to use in a particular communication, referred to as a precoder codebook. During the communication, the available precoders are evaluated based on signal measurements and if the measurements indicate that there is another precoder which is better than the currently used one, the new precoder is used instead. The above evaluation can be performed by the wireless terminal when the network node transmits certain reference signals on different beams, by measuring received power of a reference signal using different candidate precoders. This process is referred to as beam tracking.

In many wireless communications systems CSI (Channel-State Information) feedback is crucial for obtaining good performance. Typically, reference signals transmitted by the network node are used by the wireless device to estimate the channel state, whereupon the reported CSI feedback typically includes CQI (Channel-Quality Indicator), RI (Rank Indicator), and PMI (Precoding Matrix Indicator) values.

The 3GPP LTE (Long Term Evolution) system supports CSI-reporting schemes that rely on the reference symbols being transmitted periodically; cell-specific reference symbols (CRS) are sent every sub-frame while user-specific CSI-RS can be sent with a larger periodicity.

In LTE, open-loop and closed-loop MIMO are two spatial multiplexing schemes supporting multi-layer data transmissions. For closed-loop MIMO the CSI feedback comprises a PMI indicating a preferred precoder from a precoder codebook. The closed-loop MIMO scheme require accurate channel knowledge since if the wrong precoder is used, the performance of the scheme is bad.

For single-layer transmission the open-loop MIMO scheme uses transmit-diversity while for multi-layer transmission a precoding cycling scheme is used wherein a set of precoders are cycled over the sub-carriers on the scheduled resource. For the open-loop MIMO, the CSI feedback hence does no need to comprise a PMI and it has the benefit that it provides diversity in cases when the channel is not known in detailed or when the CSI is less accurate.

Future access technologies are expected to support a large number of transmit antennas, especially on the network side. In the context of Massive MIMO as an example, the number of antennas is expected to be large, where a single transmission point could have in the order of several hundreds or even thousands of antenna elements. A fairly large number of antennas could potentially be expected also in the terminal at the high carrier frequencies, since the physical size of the antenna elements at those frequencies can be made very small.

The increased number of antenna elements makes it possible to form increasingly directive antenna patterns as compared to what is possible with the older antenna systems of today. The transmitted and/or received signal can thereby be focused much more efficiently towards the wireless device, whilst suppressing the interference from and to other wireless devices. Each such direction is typically referred to as a "beam", whereas the entire process is referred to as "beam-forming".

Beamforming may be viewed as precoding wherein a beam corresponds to a precoder. It is also possible to perform precoding within a beam, for example if the beam determines an angular direction from a transmission point the transmission in the angular direction may be a precoded transmission. A precoded transmission within a beam may be described mathematically as the product WP, where W is precoder for the beam and P is precoder within the beam. In fact, the 3GPP R-13 precoder codebook has the property that each of the precoders within the codebook is a product of two (component) precoders.

FIG. 1A illustrates that a wireless device 100 receives and measures reference signals transmitted by a network node 102 in different beams using different corresponding precoders P1, P2, P3, P4, P5 . . . . A predefined sequence of such beams is typically repeated at regular intervals. This way, the wireless device 100 can evaluate the precoders based on the measurements and indicate to the network node 102 which precoder is the best and preferred one, e.g. by sending a CSI feedback comprising the above-mentioned PMI. FIG. 1B illustrates that the wireless device 100 and the network node 102 can then start to communicate data using the preferred precoder Pc as long as the wireless device 100 is within its corresponding beam Bc.

However, it is a problem that the above-described evaluation of precoders typically takes a substantial amount of time, e.g. when the received power is measured for the available precoders one by one, particularly if each individual precoder is used infrequently for transmitting a reference signal. The network node also needs to set up radio resources for the reference signals. It is therefore a problem that the radio conditions may change rapidly such that the measurements will be shortly outdated and misleading, i.e. useless, before all possibilities have been measured and evaluated. The performance can thus be deteriorated by selecting a precoder based on outdated measurements. Another problem is that precious radio resources are occupied by the reference signals which reduces the amount of radio resources that can be used for data transmissions, and additional signaling is also required for configuring the reference signals.

SUMMARY

It is an object of embodiments described herein to address at least some of the problems and issues outlined above. It is possible to achieve this object and others by using a wireless device, a network node and methods therein as defined in the attached independent claims.

According to one aspect, a method is performed by a first radio node for communicating data with a second radio node in a wireless network. In this method the first radio node communicates with the second radio node a first data transmission using a first set of precoders. The first radio node further communicates with the second radio node a precoder indicator which is based on quality of the communicated first data transmission, and identifies a second set of precoders within the first set based on the communicated precoder indicator. The first radio node then communicates with the second radio node a second data transmission using the second set of precoders.

The first radio node may be a wireless device and in that case the second radio node may be a network node. Alternatively, the first radio node may be a network node and in that case the second radio node may be a wireless device. The term "communicate" as used herein may thus refer to either transmit or receive and the above method is applicable for both uplink and downlink communication of data.

According to another aspect, a first radio node is arranged to communicate data with a second radio node in a wireless network. The first radio node is configured to communicate with the second radio node a first data transmission using a first set of precoders. The first radio node is also configured to communicate with the second radio node a precoder indicator which is based on quality of the communicated first data transmission, and to identify a second set of precoders within the first set based on the communicated precoder indicator. The first radio node is further configured to communicate with the second radio node a second data transmission using the second set of precoders.

When employing the above method and first radio node, the time it takes to evaluate a number of available candidate precoders can be substantially reduced, compared to the conventional procedures. Data is also communicated during the procedure instead of having to wait until a number of candidate precoders have been evaluated based on reference signal measurements. Further, the number of precoders to use for the data transmission can be adapted to current radio conditions and/or movements of the wireless device, e.g. by reducing the number of precoders gradually in successive iterations of the above procedure.

The above method and first radio node may be configured and implemented according to different optional embodiments to accomplish further features and benefits, to be described below.

A computer program is also provided comprising instructions which, when executed on at least one processor in the first radio node, cause the at least one processor to carry out the method described above. A carrier is also provided which contains the above computer program, wherein the carrier is one of an electronic signal, optical signal, radio signal, or a computer readable storage medium.

BRIEF DESCRIPTION OF DRAWINGS

The solution will now be described in more detail by means of exemplary embodiments and with reference to the accompanying drawings, in which:

FIG. 2 is a communication scenario illustrating an example of how the solution may be employed, according to some example embodiments.

FIG. 3 is a flow chart illustrating a procedure in a first radio node, according to further example embodiments.

FIG. 6 is a table illustrating examples of how a wireless device could indicate quality of precoders in a CSI report by referring to a tree structure of precoders, according to further example embodiments.

DETAILED DESCRIPTION

Figure 1A:
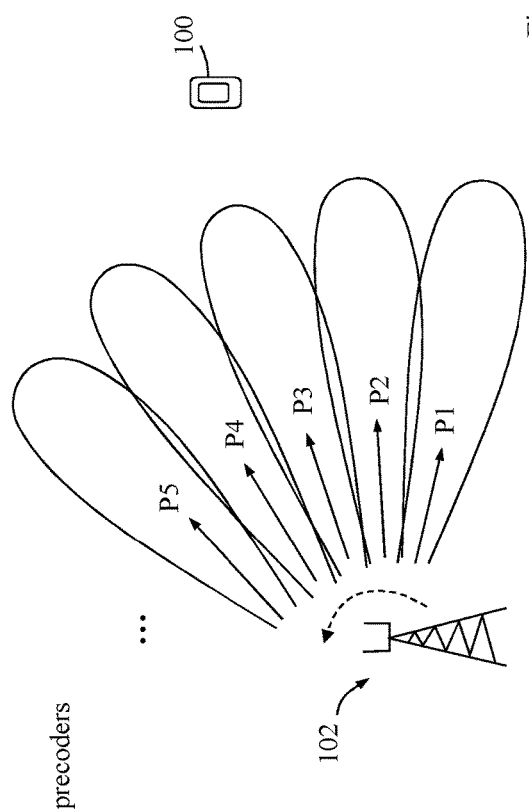
FIG. 1A is a communication scenario illustrating how reference signals are transmitted from a network node in beams using different precoders, according to the prior art.
Figure 1B:
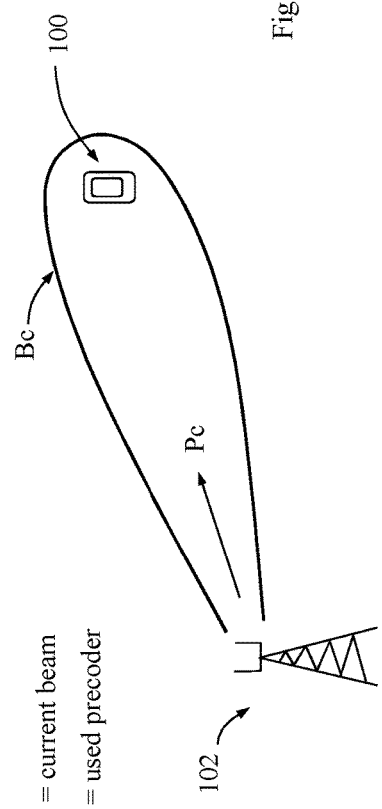
FIG. 1B is scenario illustrating communication of data using a selected precoder, according to the prior art.

Briefly described, a solution is provided to enable efficient usage of suitable precoders in a data communication between a first radio node and a second radio node, which nodes may comprise a wireless device and a network node. In more detail, the first radio node described herein may be a wireless device and the second radio node described herein may be a network node. Conversely, the solution and its embodiments described herein are also applicable when the first radio node is a network node and the second radio node is a wireless device. Further, the solution and at least some of the embodiments described herein are applicable both for uplink transmission of data and for downlink transmission of data. In this description, the term "communicate" may thus refer to either transmit or receive, and one of the first and second radio nodes is consequently a data transmitting node while the other radio node is a data receiving radio node.

When employing this solution, data communication between the first and second radio nodes is first performed by using a first set of precoders which are evaluated by means of quality measurements on the data as received using the respective precoders in the first set. Based on these measurements, a second set of precoders are selected out of, or based on, the first set, depending on the outcome of the quality measurements, e.g. by selecting the "best" precoders in the first set in terms of quality, to be included in the second set. Another option is that the precoders in the first set produce relatively wide beams, while the precoders in the second set produce more narrow beams.

The second set of precoders can be identified by means of a precoder indicator communicated between the first and second radio nodes. For example, the network node may determine which precoders to include in the second set, based on the above measurements on the first set of precoders, and send a precoder indicator to the wireless device which then uses the precoder indicator to identify the second set of precoders. The precoder indicator described herein may also be called a precoder CSI indicator and these terms are used herein interchangeably.

The data communication then continues by using the second set of precoders which can likewise be evaluated in terms of quality. The same data may be communicated for all precoders in either of the first and second sets, respectively, while new data may be communicated in the second transmission relative the first transmission.

This procedure may be repeated at least once by using the second set of precoders as a new first set of precoders in a new first data transmission, and so forth, and such "iterations" over multiple available candidate precoders may be repeated to narrow down the resulting beam coverage for each iteration, e.g. until only one precoder remains which is hopefully the best one to use in terms of quality. In that case, the procedure has started with open-loop precoder transmission using multiple precoders where the precoder evaluation takes place, and ends up with closed-loop precoder transmission using only the best precoder. It is also possible that the second set of precoders could include only one precoder. It may also be possible to end up with using a limited set of precoders of good quality to provide diversity, thus not necessarily using just a single one.

When evaluating the first and second sets of precoders, respectively, the precoders may be "cycled" over a set of sub-carriers used in the respective data transmission, which means that each precoder is used individually for communicating the data in at least one respective sub-carrier. The precoders can thereby be evaluated individually based on signals measurements on the respective sub-carriers. In this scheme, the same data may be transmitted in all subcarriers. The above evaluation of precoders may also be assisted by conventional channel estimation based on quality measurements on Demodulation Reference Signals, referred to as DM-RS.

When using the solution and any of the embodiments described herein, it is an advantage that the time it takes to evaluate a number of available candidate precoders can be substantially reduced, as compared to the conventional procedures which rely on the occurrence of reference signals. Another advantage is that data is communicated during the procedure instead of waiting with the data communication until a number of candidate precoders have been evaluated and a suitable precoder has been selected based on reference signal measurements. Yet another advantage is that the number of precoders to use for data transmission is flexible and can be adapted to current radio conditions and/or movements of the wireless device. The number of precoders to use for data transmission may also be reduced gradually, e.g. in successive iterations, and the width of the resulting beams can be correspondingly reduced.

An example of how the solution may be employed in an example scenario will now be described with reference to FIG. 2 involving a wireless device 200 which is being served by a network node 202. The data communication in this example may be either uplink or downlink communication. A first action 2:1 illustrates that the wireless device 200 and the network node 202 communicate a first transmission (Tx) using a first set of precoders, herein denoted "S1". The quality of received signals in this communication is measured as a basis for evaluating the precoders in the first set. For example, if the first transmission is a downlink transmission from the network node 202, the wireless device 200 is able to measure the quality of received signals for each precoder, as shown by an action 2:2A. On the other hand, if the first transmission is an uplink transmission from the wireless device 200, the network node 202 will measure the quality for each precoder, as shown by an action 2:2B.

In the case of downlink transmission, the wireless device 200 may, in an action 2:3, send to the network node 202 a CSI report which is based on the measurements made in action 2:2A. The CSI report may indicate the quality of the individual precoders in the first set, or it may indicate one or more preferred precoders as evaluated by the wireless device 200. The above-described actions 2:1-2:3 thus constitute an evaluation of the first set of precoders, which may be used to eliminate one or more precoders that provide inadequate quality so as to narrow down the choice of precoders that should be further evaluated in the next transmission of data. Alternatively, the evaluation of the first set of precoders may be used to identify a new set of precoders producing more narrow beams than the first set of precoders.

Based on either the CSI report received in action 2:3 in the downlink case, or the measurements made in action 2:2B in the uplink case, the network node 202 sends a precoder indicator to the wireless device 200, in an action 2:4, which precoder indicator is based on quality of the communicated first data transmission. The precoder indicator indicates, either explicitly or implicitly, a second set of precoders, herein denoted "S2", which has thus been determined by the network node 202 on the basis of either the CSI report received in action 2:3 in the downlink case, or the measurements made in action 2:2B in the uplink case. Some examples of how the precoder indicator may indicate the second set of precoders, will be described in more detail below. Thereby, the wireless device 200 is able to identify the second set of precoders S2 based on the received precoder indicator. A final action 2:6 illustrates that a second data transmission is communicated between the wireless device 200 and the network node 202 using the second set of precoders S2.

An example will now be described with reference to the flow chart in FIG. 3, of how the solution may be employed in terms of actions performed by a first radio node which could be either of the above-described wireless device 200 and network node 202. FIG. 3 is described below with further reference to FIG. 2. This procedure also involves a second radio node which could be the above-described network node 202 in case the first radio node is the wireless device 200, or conversely the second radio node could be the above-described wireless device 200 in case the first radio node is the network node 202. Further, the procedure in FIG. 3 is applicable for both downlink and uplink communication of data.

Some optional example embodiments that could be used in this procedure will also be described below. This procedure may be employed when the first radio node 200 or 202 is operating in any type of wireless network and any suitable protocols and standards may be employed by the first radio node for communication in this network.

The actions in this procedure are thus performed by the first radio node 200 or 202 for communicating data with a second radio node 202 or 200 in a wireless network. A first optional action 300 indicates that the first radio node may obtain a first set of precoders S1, e.g. from a memory or server where a number of predefined precoders are stored in a precoder codebook or the like, which is customary in wireless networks that employ precoders and beamforming.

In a next action 302, the first radio node 200 or 202 communicates with the second radio node 202 or 200 a first data transmission using the first set of precoders S1, which corresponds to action 2:1 in FIG. 2. A further optional action 304 illustrates that the first radio node may obtain a quality of the communicated first data transmission using different precoders, e.g. from a CSI report as received in action 2:3 in the downlink case, or from measurements as performed in action 2:2B in the uplink case.

In a next action 306, the first radio node communicates with the second radio node a precoder indicator which is based on the quality of the communicated first data transmission, e.g. as obtained in action 304. In this action, which corresponds to action 2:4 in FIG. 2, the first radio node sends the precoder indicator to the second radio node if the first radio node is the network node 202, or receives the precoder indicator from the second radio node if the first radio node is the wireless device 200. It was mentioned above that the precoder indicator indicates either explicitly or implicitly a second set of precoders, and some examples will be described later below.

In a further action 308, the first radio node identifies a second set of precoders S2, which is within or based on the first set S1, based on the communicated precoder indicator. The first radio node then communicates with the second radio node a second data transmission using the second set of precoders, as shown in a final action 310, which corresponds to action 2:6 in FIG. 2.

Some further example embodiments of the above procedure will now be outlined. In one example embodiment, the first and second data transmissions are downlink data transmissions, and in that case the first radio node may communicate with the second radio node Channel State Information, CSI, feedback which is based on quality measurements on the first data transmission, as a basis for said precoder indicator. In this embodiment, the quality measurements have thus been performed by a wireless device 200 when receiving data using the different precoders in the first set and the CSI feedback is sent from the wireless device 200.

When the above embodiment is used, another example embodiment may be that the communicated CSI feedback comprises a ranking of the precoders in the first set in terms of quality, e.g. ranking from the precoder providing the best received quality to the precoder providing the poorest received quality. Yet another example embodiment may be that the CSI feedback indicates a suggested second set of precoders as a basis for said precoder indicator. Hence, the wireless device 200 may be able to evaluate its measurements on the downlink data transmission so as to determine which precoders to include in the second set, such as the ones providing the best received quality.

In another example embodiment, the first and second data transmissions are uplink data transmissions, and in that case a network node 202 is enabled to perform quality measurements on the first data transmission as a basis for said precoder indicator. In this embodiment, the wireless device 200 transmits the data and the quality measurements are performed by the network node 202 when receiving data using the different precoders in the first set.

Regardless of whether the data transmissions are downlink or uplink, another embodiment may be that the precoder indicator indicates one or more Precoder Resource Groups, PRGs, or sub-bands for the first set of precoders S1 used in the first data transmission. The precoders may thus have been divided into PRGs or sub-bands in a known manner.

Figure 9:
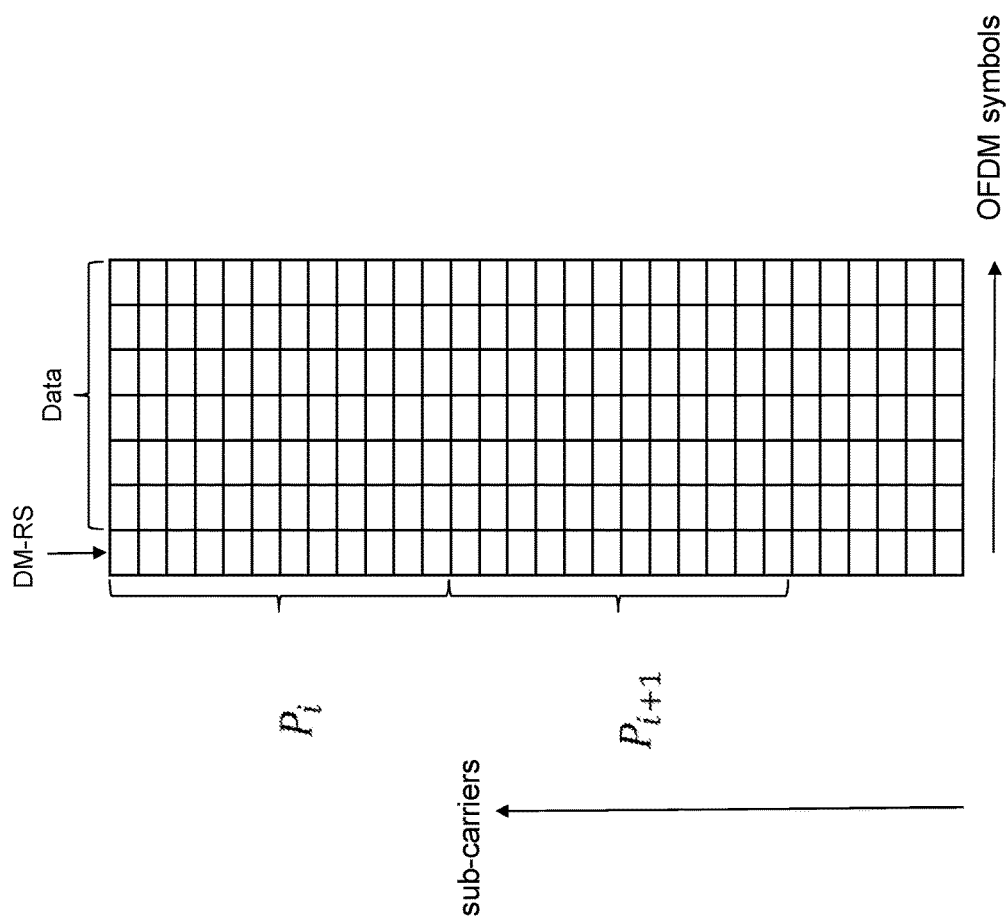
FIG. 9 illustrates an example of how precoders can be cycled over a set of sub-carriers, according to further example embodiments.

In another example embodiment, the precoders in the first set may be cycled over a set of sub-carriers used in the first data transmission so that each precoder is used for communicating the data in at least one respective sub-carrier. An example of how this embodiment may be employed is illustrated in FIG. 9, to be described later below.

When the latter embodiment is used, another example embodiment may be that the precoder indicator is based on quality of said sub-carriers, either as measured by the network node 202 in the uplink case, or as measured and reported by the wireless device 200 in the downlink case.

Figure 5:
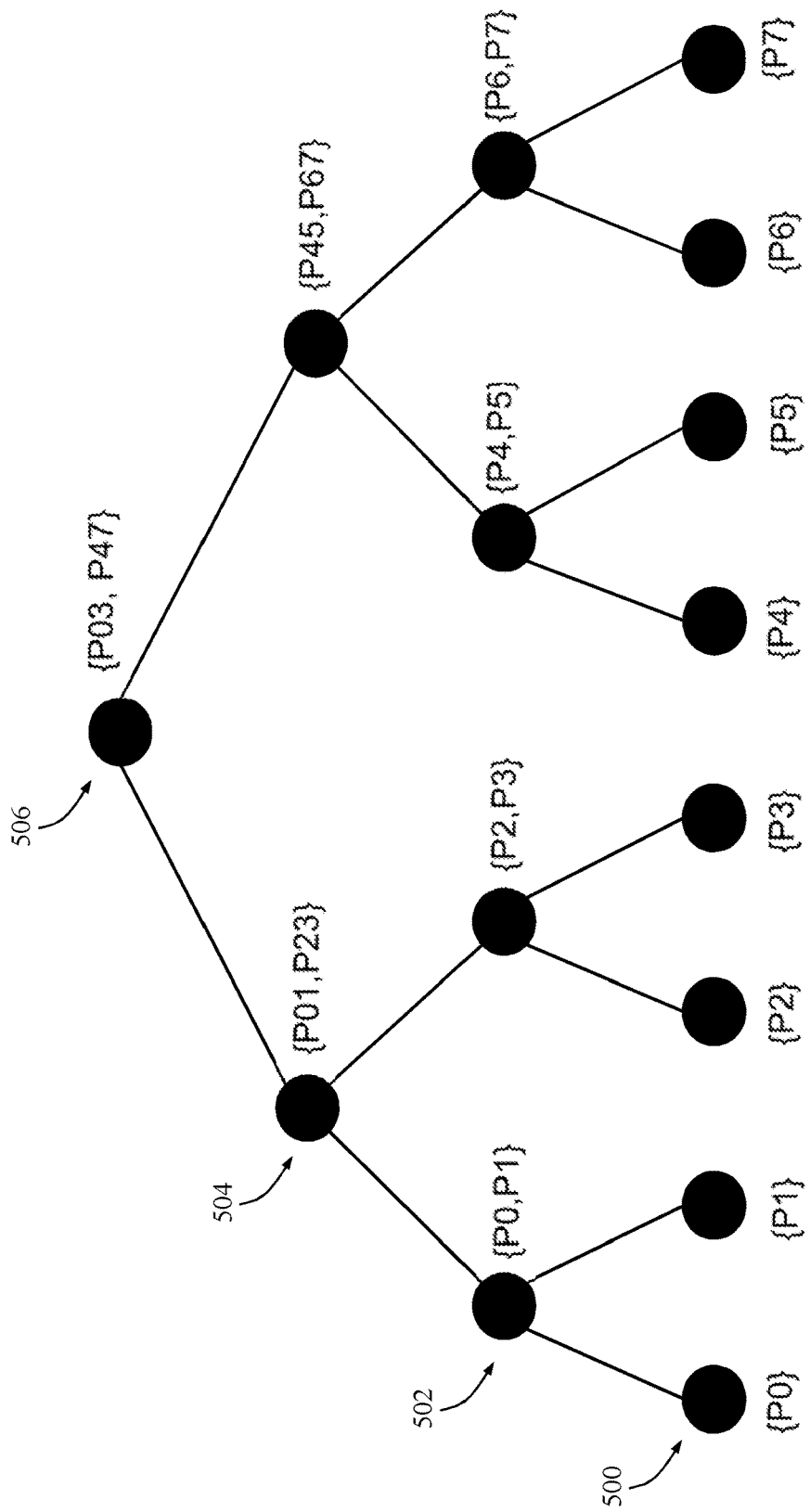
FIG. 5 illustrates an example of how available precoders can be represented in a tree structure, according to further example embodiments.

In another example embodiment, the precoder indicator may comprise a reference to a tree structure with available precoders, where the tree structure comprises parent nodes and at least two child nodes connected to each parent node. Parent node and child node are customary terms in the field of tree structures. In this embodiment, all or at least some available precoders have thus been organized in a tree structure in a manner known to both the first and second radio nodes, i.e. both the wireless device 200 and the network node 202, which means that the precoders in the second set can be indicated by a brief reference to the tree structure instead of stating their identities in full. An example of such a tree structure and how its precoders can be referenced is shown in FIG. 5 which will be described later below.

When the latter embodiment is used, another example embodiment may be that the precoder indicator comprises a reference to one of the parent nodes indicating that precoders situated under the referenced parent node shall be used when communicating the second data transmission. Examples of this embodiment will also be described later below with reference to FIG. 5.

In another example embodiment, the first data transmission may be divided into at least two code blocks and in that case corresponding subsets of the first set of precoders may be used when communicating the at least two code blocks in the first data transmission. In this embodiment, if the first data transmission is a downlink transmission, it is comprised of two or more code blocks and a subset of the first set of precoders S1 is used for each of the code blocks. For example, S11 and S12 may be two subsets of S1 where S11 is used for a first code block and S12 is used for a second code block. The wireless device may then use success or non-success of the decoding of the two or more code blocks when determining its CSI feedback.

In another example embodiment, in case the foregoing embodiment is employed for downlink data transmission, the communicated CSI feedback may indicate that at least one of said code blocks were received with better quality than the other code block(s). In another example embodiment, the procedure in FIG. 3 may be repeated at least once by using the second set of precoders as a new first set of precoders for communicating with the second radio node a new first data transmission. In other words, the second set of precoders used in the second data transmission as of action 310 is used as a new first first set of precoders in a new first data transmission as of action 302. Hence, action 308 can be regarded as a variant of action 300 with respect to the new first first set of precoders. The next set of precoders after action 310 can alternatively be referred to as a third set of precoders which is used in a third data transmission, and so forth.

Figure 4:
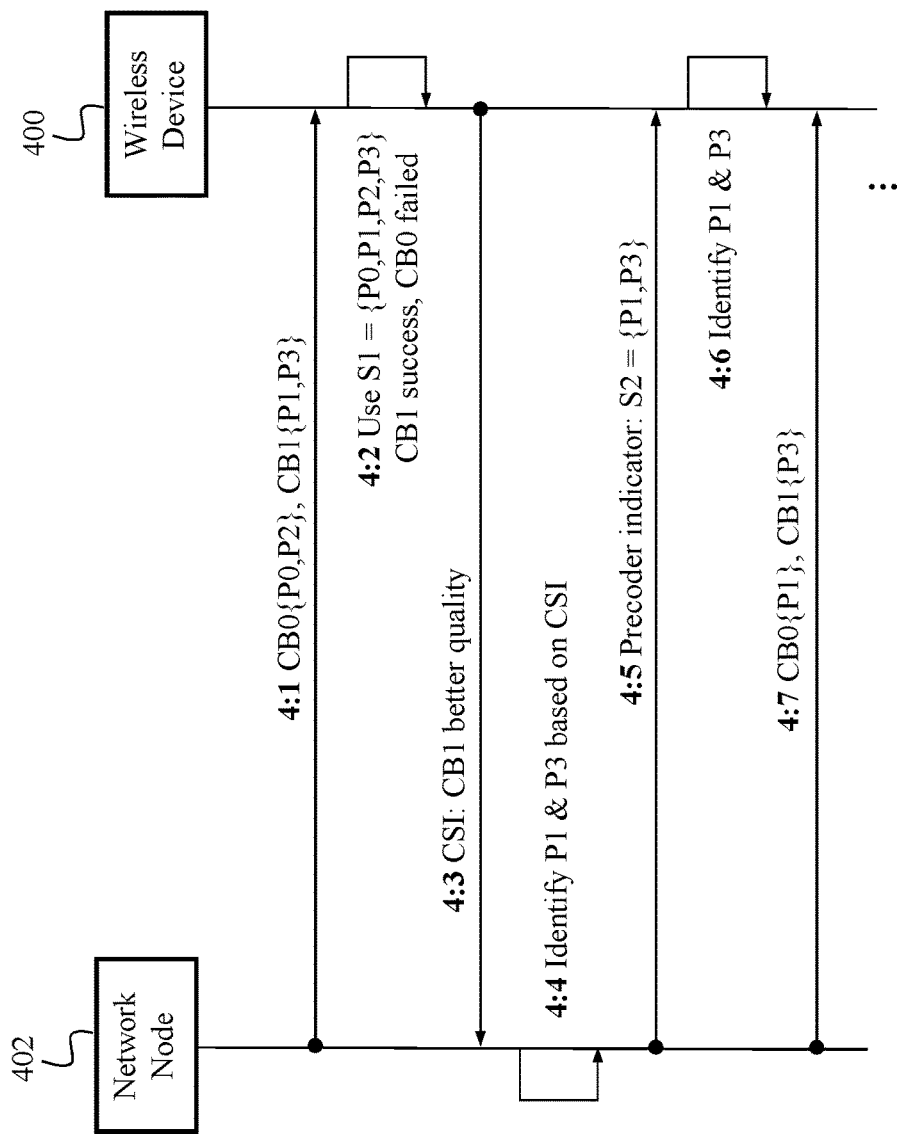
FIG. 4 is a signaling diagram illustrating an example of a procedure when the solution is used, according to further example embodiments.

An example of how the solution may be employed in the case when the first and second data transmissions are downlink data transmissions comprised of code blocks CB, will now be described with reference to the signaling diagram in FIG. 4 involving a wireless device 400 that receives the data and a network node 402 that transmits the data. Similar to the foregoing examples, any of the wireless device 400 and the network node 402 may correspond to the above-described first radio node. In this example, the first set of precoders S1 comprises 4 precoders denoted P0, P1, P2 and P3, hence S1={P0, P1, P2, P3}, and the first set is known to the wireless device 400.

In a first action 4:1, the network node 402 transmits a first data transmission in two code blocks CB0 and CB1, using precoders P0 and P2 for transmitting code block CB0 and using precoders P1 and P3 for transmitting code block CB1. A further action 4:2, illustrates that the wireless device 400 receives the using the precoders in S1={P0, P1, P2, P3} and the wireless device 400 also attempts to decode each code block CB0, CB1. As a result, code block CB1 could be decoded successfully by using P1 and P3 but the decoding of code block CB1 has failed altogether. The wireless device 400 then returns CSI feedback to the network node 402 in an action 4:3, which indicates that code block CB1 was received with better quality than code block CB0.

A next action 4:4 illustrates that the network node 402 identifies precoders P1 and P3 as the best precoders, based on the received CSI feedback, and precoders P1 and P3 are accordingly included in the second set of precoders S2. The network node 402 then sends a precoder indicator to the wireless device 400 in an action 4:5, indicating that the second set of precoders S2={P1, P3} shall be used in a second data transmission. As said above, the precoder indicator may indicate S2 explicitly, e.g. by specifying each precoder therein, or implicitly by means of a brief reference, e.g. to a known tree structure, from which precoders P1 and P3 can be identified. Accordingly, the wireless device 400 identifies S2={P1, P3} in an action 4:6.

In the second data transmission, the network node 402 transmits two further code blocks CB0 and CB1, using precoder P1 for transmitting code block CB0 and using precoder P3 for transmitting code block CB1. The procedure may now continue, not shown, basically by repeating actions 4:2-4:7 using the precoders in S2 in a new first set of precoders S1.

It was mentioned above that the precoder indicator may comprise a reference to a tree structure with available precoders, e.g. defined in the form of a codebook. An example of such a tree structure is illustrated in FIG. 5 where the tree structure is a binary tree in the sense that it comprises parent nodes and 2 child nodes connected to each parent node. The leaves in this tree structure represent the precoders themselves, in this case 8 precoders denoted P0-P7 at a bottom level 500 of the tree. In a next level 502, there are 4 parent nodes, each being connected to 2 leaves which are thus child nodes to the parent nodes at level 502.

In a third level 504 of the tree, there are 2 parent nodes each being connected to 2 child nodes, the latter nodes being the parent nodes at the second level 502. Each parent node at the third level 504 thus represents 4 precoders P0-P3 and P4-P7, respectively. At the top level 506, a single node is connected to the 2 nodes in the third level 504 below, the single node thus representing all precoders P0-P7. Examples of how the different nodes could be referenced are given in the figure, although there are also other possible ways of denoting the nodes.

Figure 5A:
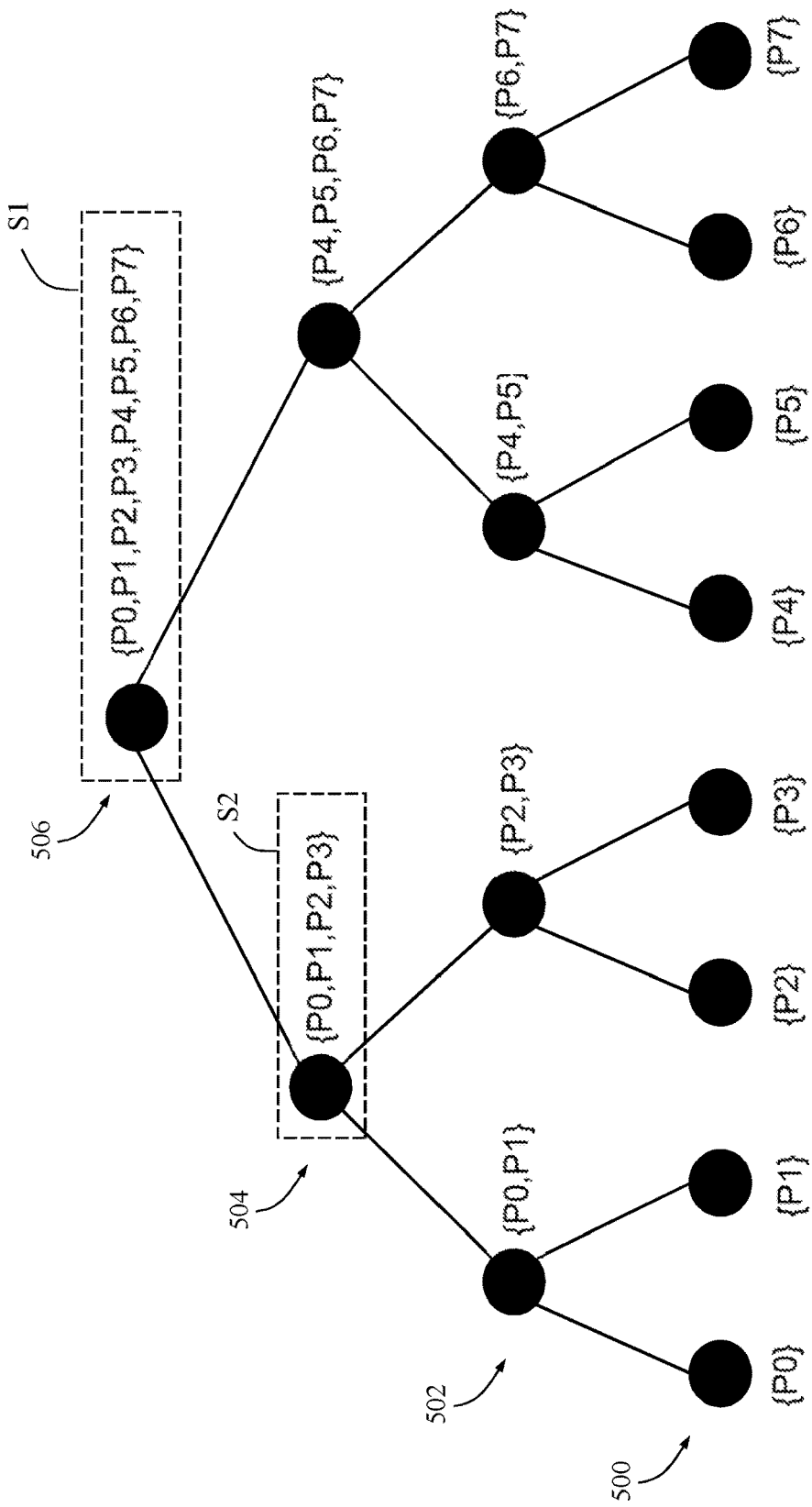
FIGS. 5A and 5B illustrate two iterations of the tree structure in FIG. 5 when the solution is used, according to further example embodiments.

FIG. 5A illustrates how a first iteration of the tree structure may be employed in embodiments described herein, where the first set of precoders S1 used in the first data transmission includes all precoders P0-P7 in the tree, as represented by the single top node indicated by a first dashed square. When executing the procedure of FIG. 3, the second set of precoders S2 used in the second data transmission includes only precoders P0-P3, as represented by the left node at level 504, also indicated by a second dashed square.

Figure 5B:
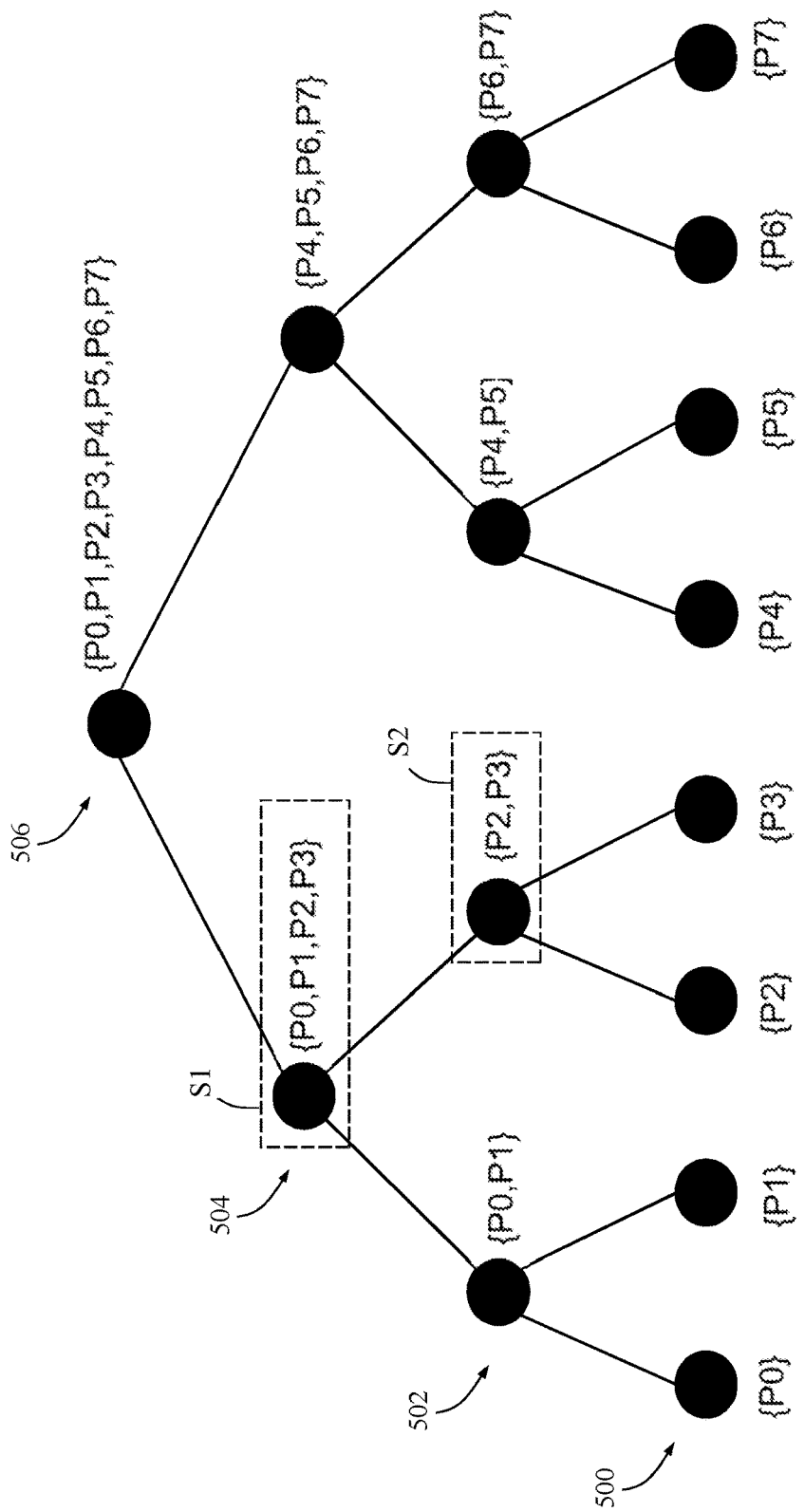

FIG. 5B illustrates how a second iteration of the tree structure may be employed after the first iteration, where the first set of precoders S1 used in the first data transmission is the former second set of precoders S2 including precoders P0-P3, as represented by the left node at level 504, also indicated by a first dashed square. When executing the procedure of FIG. 3 a second time, the second set of precoders S2 used in the second data transmission includes only precoders P2-P3, as represented by the second node at level 504, also indicated by a second dashed square. Thereby, the number of precoders has been substantially reduced from 8 precoders to 2 precoders. A third iteration of the tree structure, not shown, could also be performed which may result in a single precoder, either P2 or P3, after using the former second set S2 of the second iteration as a new first set S1 in the third iteration.

When employing a tree structure to represent different sets of precoders, e.g. as shown in FIGS. 5, 5A, 5B, it is sufficient to use a small number of bits to indicate a certain set of precoders, as compared to indicating each precoder individually and explicitly. FIG. 6 is a table with some examples of how only two bits can be used to navigate in such a tree structure for determining a next set of precoders, by staying at a current node (00), go to the parent node (01), go to the first child node (10), and go to the second child node (11). The two bits are thus sufficient to indicate 4 different instructions for how to find the next set of precoders in the tree. This encoding scheme of FIG. 6 may be used in the above-described precoder indicator from the network node, and also in the above-described CSI feedback from the wireless device, in the latter case to indicate a suggested second set of precoders.

Figures 7, 7A:
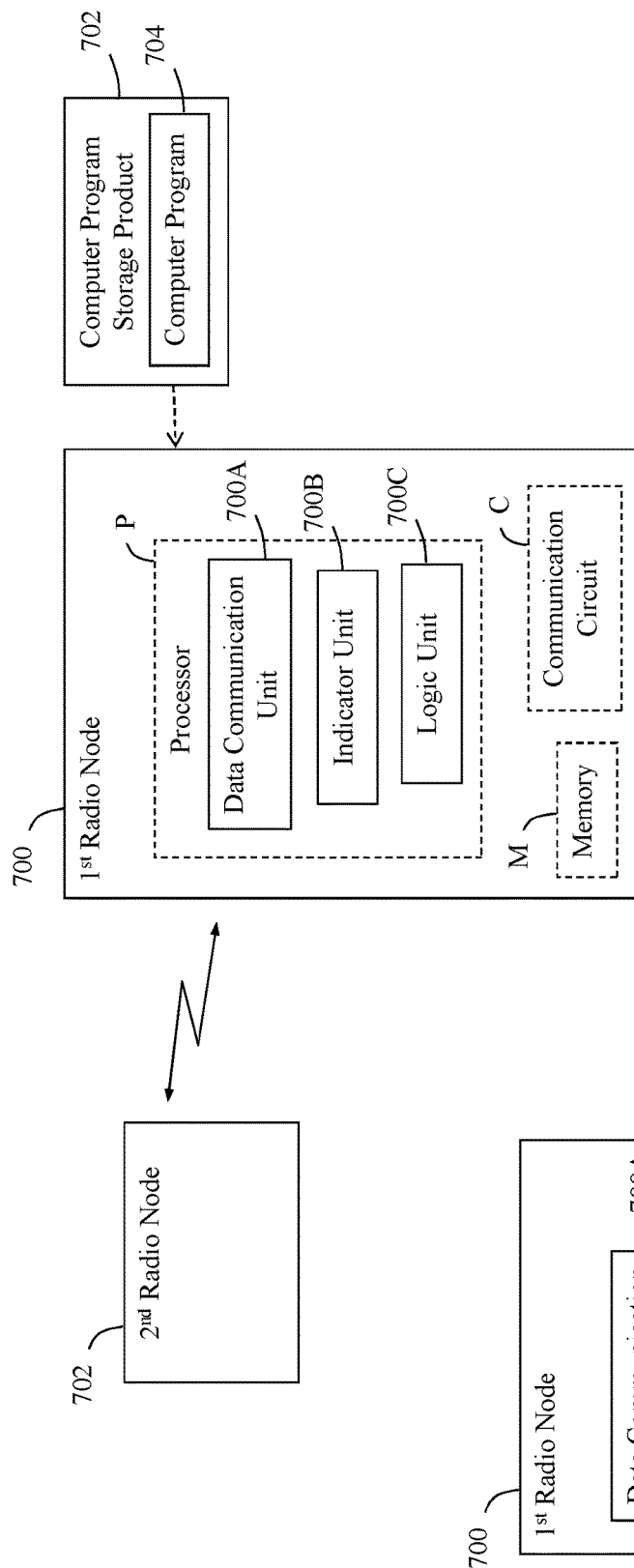
FIG. 7 is a block diagram illustrating how a first radio node may be structured, according to further example embodiments.

The block diagram in FIG. 7 illustrates a detailed but non-limiting example of how a first radio node 700 may be structured to bring about the above-described solution and embodiments thereof. The first radio node 700 may be configured to operate according to any of the examples and embodiments of employing the solution as described above, where appropriate, and as follows. The first radio node 700 is shown to comprise a processor P and a memory M, said memory comprising instructions executable by said processor P whereby the first radio node 700 is operable as described herein. The first radio node 700 also comprises a communication circuit C with suitable equipment for transmitting and receiving signals in the manner described herein.

The communication circuit C is configured for communication with a second radio node 702 using suitable protocols depending on the implementation. This communication may be performed in a conventional manner over radio links for wireless communication and using a suitable protocol depending on the implementation, which is not necessary to describe here as such in any detail. The solution and embodiments herein are thus not limited to using any specific types of networks, technology or protocols for radio communication.

The first radio node 700 comprises means configured or arranged to perform at least some of the actions 300-310 in FIG. 3. The first radio node 700 is arranged or configured to communicate data with a second radio node 702 in a wireless network.

The first radio node 700 is configured to communicate with the second radio node 702 a first data transmission using a first set of precoders S1. This operation may be performed by a data communication unit 700A in the first radio node 700, e.g. in the manner described for action 302 above.

The first radio node 700 is also configured to communicate with the second radio node 702 a precoder indicator which is based on quality of the communicated first data transmission. This operation may be performed by an indicator unit 700B in the first radio node 700, e.g. as described for action 306 above. The indicator unit 700B could alternatively be named a signaling unit or instructing unit.

The first radio node 700 is also configured to identify a second set of precoders S2 within the first set S1 based on the communicated precoder indicator. This operation may be performed by a logic unit 700C in the first radio node 700, e.g. as described above for action 308. The logic unit 700C could alternatively be named a determining unit or commanding unit. The first network node 700 is also configured to communicate with the second radio node 702 a second data transmission using the second set of precoders, e.g. as described above for action 310. This operation may be performed by the data communication unit 700A.

It should be noted that FIG. 7 illustrates various functional modules or units in the first radio node 700, and the skilled person is able to implement these functional modules or in practice using suitable software and hardware. Thus, the solution is generally not limited to the shown structures of the first radio node 700, and the functional modules or units 700A-C therein may be configured to operate according to any of the features and embodiments described in this disclosure, where appropriate.

The functional modules or units 700A-C described above can be implemented in the first radio node 700 by means of suitable hardware and program modules of a computer program comprising code means which, when run by the processor P causes the first radio node 700 to perform at least some of the above-described actions and procedures.

Another example of how the first radio node 700 may be configured is schematically shown in the block diagram of FIG. 7A. In this example, the first radio node 700 comprises the functional modules 700A-C and a processor P, the modules 700A-C being configured to operate in the manner described above as controlled by the processor P.

In either FIG. 7 or FIG. 7A, the processor P may comprise a single Central Processing Unit (CPU), or could comprise two or more processing units such as CPUs. For example, the processor P may include a general purpose microprocessor, an instruction set processor and/or related chip sets and/or a special purpose microprocessor such as an Application Specific Integrated Circuit (ASIC). The processor P may also comprise a storage for caching purposes.

Each computer program may be carried by a computer program product in the first radio node 700 in the form of a memory having a computer readable medium and being connected to the processor P. The computer program product or memory in the first radio node 700 may thus comprise a computer readable medium on which the computer program is stored e.g. in the form of computer program modules or the like. For example, the memory may be a flash memory, a Random-Access Memory (RAM), a Read-Only Memory (ROM), an Electrically Erasable Programmable ROM (EEPROM) or hard drive storage (HDD), and the program modules could in alternative embodiments be distributed on different computer program products in the form of memories within the first radio node 700.

The solution described herein may be implemented in the first radio node 700 by means of a computer program product 702 comprising a computer program 704 with computer readable instructions which, when executed on the first radio node 700, cause the first radio node 700 to carry out the actions and features according to any of the above embodiments, where appropriate.

Some further variants and features that could be employed in the embodiments herein, will now be outlined.

In some examples, the CSI feedback may be transmitted by the wireless device as UCI (Uplink Control Information) multiplexed with uplink data on a PUSCH (Physical Uplink Shared Channel), while in other examples the CSI feedback may be transmitted by the wireless device on an uplink control channel, e.g. PUCCH (Physical Uplink Control Channel) such as the short PUCCH or the long PUCCH. The PSO indicator may in some embodiments be received in a DCI (Downlink Control Information) message or a MAC (Medium Access Control) control element.

In some further examples, the first data transmission may comprise URLLC (Ultra-Reliable Low Latency Communication) data and the transmission may be a grant-free transmission wherein the wireless device performs a very fast first data transmission without detailed channel knowledge. After the first transmission, the wireless device may receive an uplink re-transmission grant comprising a precoder indicator relating to the first set of precoders used for the first data transmission. The wireless device then determines a second set of precoders to be used for the second data transmission, based on the precoder indicator.

In some further examples, the choice of best precoder may be done by estimating the average received power on the data symbols carrying the data precoded with a certain precoder Pij. A better estimation of quality can in this case be obtained, as compared to the estimate obtained when only using the DM-RS (De-Modulation Reference Signal) as in conventional procedures. Even so, the embodiments herein may be assisted by an estimation of quality based on DM-RS.

In some further examples, the CSI feedback may in the downlink case be determined by the wireless device after data decoding of the received first transmission. A benefit with this may be that the data symbols determined after decoding, e.g. determined complex values of QPSK (Quadrature Phase Shift Keying) symbols, can be utilized when determining the CSI feedback. Hence, a better estimate of the effective channel can be obtained for a certain precoder, i.e. Pij above. This is schematically illustrated in FIG. 8 showing three examples 1-3 of a sub-carrier/OFDM symbol grid or scheme transmitted by the network node, where the grid includes known symbols that may be used as pilots for quality estimation of precoders.

Figure 8:
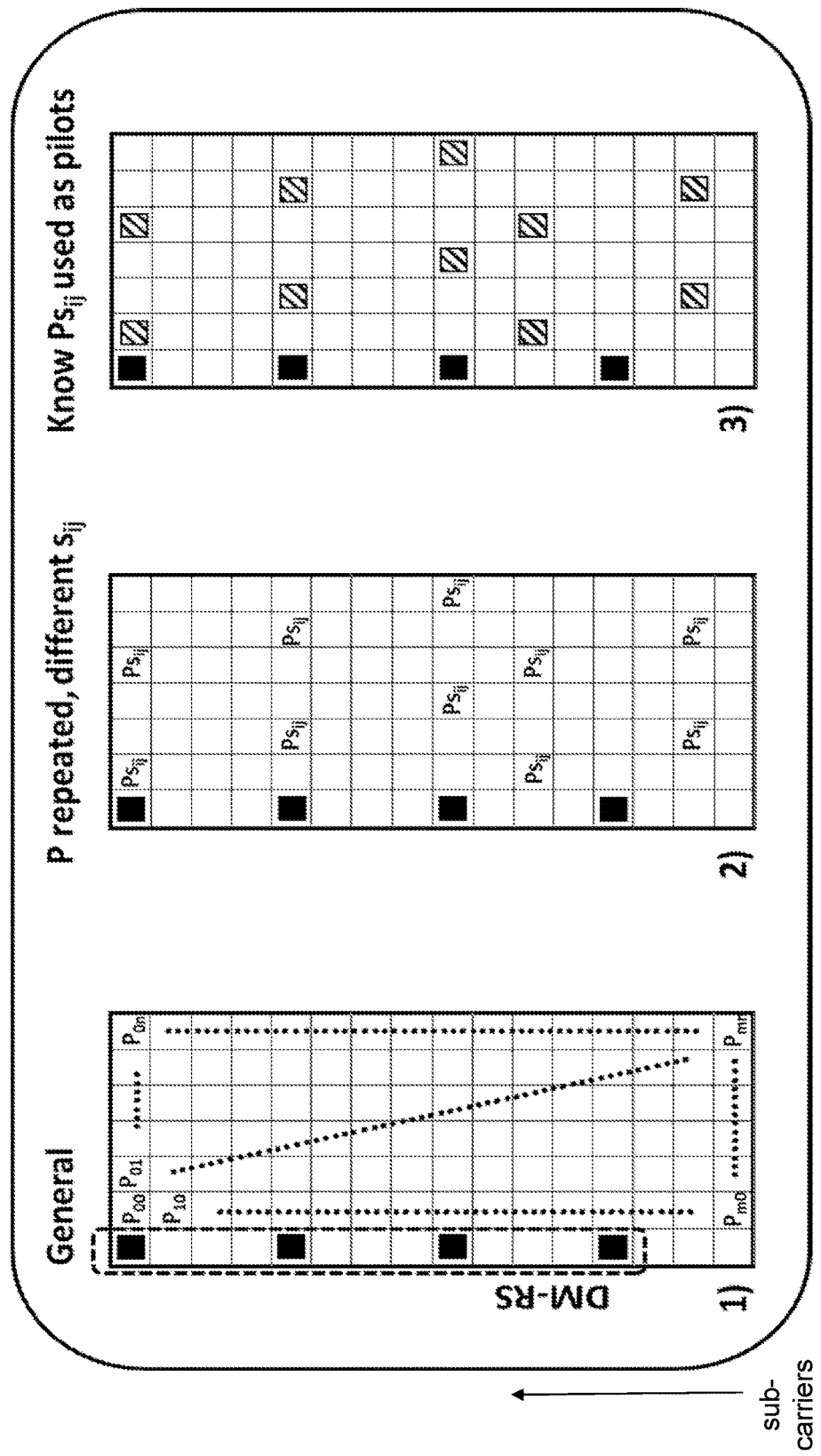
FIG. 8 illustrates how known symbols may be used as pilots for quality estimation of precoders, according to further example embodiments.

In example 1 of FIG. 8, the DM-RSs are indicated as black boxes in the first symbol (first column) and each Pij in the time-frequency entries indicates a precoder used to pre-code the data symbols therein. If decoding of the data succeeds, the data symbol precoded by Pij will be known and hence the quality of Pij can be determined. The middle example 2 illustrates that a particular precoder P is used with a periodicity over the time-frequency resources for data. If the data symbols precoded by P is successfully decoded, each of the time-frequency resources, illustrated as dashed squares in the right-hand example 3, give a quality estimate of the precoder P. The average of the quality estimates may be used when determining the CSI feedback.

In some further examples, the precoder used may be transparent to the wireless device. In that case, the same precoder may be used for DM-RS and data for a set of time-frequency resources as illustrated in FIG. 9 where the same precoder $P_i$, $P_{i+1}$, is used for both DM-RS and data in a sub-band of sub-carriers. The wireless device does not need to be aware of the precoders used in the sub-bands, although the sub-bands are known by the wireless device. The CSI feedback may in such a case indicate which of sub-bands is/are the best sub-bands, which indicates implicitly to the network node which of the precoders is the best precoder.

In another example, the precoders used in an open-loop precoder cycling transmission may be complemented with additional CSI-RS transmissions. The wireless device can then determine the CSI both on the dimensions spanned by the precoder cycling transmission as well as on the dimensions spanned by the CSI-RS transmissions. For example, it may be desirable to evaluate the quality of 16 precoders, while only 8 precoders can be used in the data transmission. In that case, CSI-RS transmissions may be precoded using the other 8 precoders.

This can be used to reduce the number of CSI-RS reference signals that are transmitted. It may also be a way for the network to opportunistically provide CSI-RS signals. When there is an active downlink transmission to one wireless device, the network may choose to start to transmit CSI-RS signals. If a new wireless device starts its uplink transmission while CSI-RS are transmitted, the CSI feedback can be based on measurements on the CSI-RS signals. If no CSI-RS signals are transmitted the wireless device may instead calculate CSI-RS feedback based on the precoders used in the precoder cycling transmission scheme.

It should be noted that the above example of combining determination of CSI feedback on both used precoders in an active transmission and CSI-RS, may be equally applicable for uplink transmissions.

Differential beamforming is a procedure in which the beamforming can be gradually improved based on feedback from the wireless device. In a first step the wireless device may e.g. select between one out of four wide beams and report the best one. In the next step the best beam is further differentiated into a set of fore narrower beams, and so on.

In another example, differential precoder search may be implemented also for CSI feedback on a transmission where precoder cycling is used. In a first transmission, the precoder cycling may e.g. be based on coarse quantization of precoder weights such as ±1 and ±j. Then, the wireless device may in a first operation report which of these that results in the highest channel quality. In a next operation, the precoder cycling can be based on smaller modifications of the selected precoder from the first operation. For example, a set of candidate precoders to be used for precoder cycling transmission may be constructed by π/4 (45 degrees) rotations from the selected precoder in the first operation. Next, the best precoder from step 2 may be used as a basis to create a set of candidate beam-formers for precoder cycling by π/8 rotations from the selected precoder, and so forth. The number of operations to iterate such a differential search may be dependent on the wireless device's current speed.

It may be noted that this principle of differential feedback and beamforming refinement based on precoder cycling feedback may be equally applicable for uplink transmissions.

While the solution has been described with reference to specific exemplifying embodiments, the description is generally only intended to illustrate the inventive concept and should not be taken as limiting the scope of the solution. For example, the terms "radio node", "wireless device", "network node" and "precoder indicator" have been used throughout this disclosure, although any other corresponding entities, functions, and/or parameters could also be used having the features and characteristics described here. The solution is defined by the appended claims.

The invention claimed is:

1. A method performed by a first radio node for communicating data with a second radio node in a wireless network, the method comprising:
communicating, with the second radio node, a first data transmission using a first set of precoders;
communicating, with the second radio node, a precoder indicator that is based on quality of the communicated first data transmission;
identifying a second set of precoders within the first set, based on the communicated precoder indicator; and
communicating, with the second radio node, a second data transmission using the second set of precoders.

2. The method of claim 1, wherein the first and second data transmissions are downlink data transmissions, and wherein the first radio node communicates, with the second radio node, Channel State Information (CSI) feedback based on quality measurements on the first data transmission as a basis for said precoder indicator.

3. The method of claim 2, wherein the CSI feedback comprises a ranking of the precoders in the first set in terms of quality.

4. The method of claim 2, wherein the CSI feedback indicates a suggested second set of precoders as a basis for said precoder indicator.

5. The method of claim 1, wherein the first and second data transmissions are uplink data transmissions enabling a network node to perform quality measurements on the first data transmission as a basis for said precoder indicator.

6. The method of claim 1, wherein the precoder indicator indicates one or more PRGs (Precoder Resource Groups) or sub-bands for the first set of precoders used in the first data transmission.

7. The method of claim 1, wherein the precoders in the first set are cycled over a set of sub-carriers used in the first data transmission so that each precoder is used for communicating the data in at least one respective sub-carrier.

8. The method of claim 7, wherein the precoder indicator is based on quality of said sub-carriers.

9. The method of claim 1, wherein the precoder indicator comprises a reference to a tree structure with available precoders, the tree structure comprising parent nodes and at least two child nodes connected to each parent node.

10. The method of claim 9, wherein the precoder indicator comprises a reference to one of the parent nodes indicating that precoders situated under the referenced parent node shall be used when communicating the second data transmission.

11. The method of claim 1, wherein the first data transmission is divided into at least two code blocks and corresponding subsets of the first set of precoders are used when communicating the at least two code blocks in the first data transmission.

12. The method of claim 11, wherein the first and second data transmissions are downlink data transmissions, and wherein the first radio node communicates, with the second radio node, Channel State Information (CSI) feedback based on quality measurements on the first data transmission as a basis for said precoder indicator, and wherein the CSI feedback indicates that at least one of said code blocks were received with better quality than the other code block(s).

13. The method of claim 1, wherein the method is repeated at least once by using the second set of precoders as a new first set of precoders for communicating with the second radio node a new first data transmission.

14. A first radio node arranged to communicate data with a second radio node in a wireless network, wherein the first radio node comprises:
a communication circuit configured to communicate with the second radio node;
a processor operatively connected to the communication circuit; and
a memory operatively connected to the processor and storing program instructions for execution by the processor, whereby the processor is configured control the first radio node to:
communicate, with the second radio node, a first data transmission using a first set of precoders,
communicate, with the second radio node, a precoder indicator that is based on quality of the communicated first data transmission,
identify a second set of precoders within the first set based on the communicated precoder indicator, and
communicate, with the second radio node, a second data transmission using the second set of precoders.

15. The first radio node of claim 14, wherein the first and second data transmissions are downlink data transmissions, and wherein the first radio node is configured to communicate, with the second radio node, Channel State Information (CSI) feedback based on quality measurements on the first data transmission as a basis for said precoder indicator.

16. The first radio node of claim 15, wherein the CSI feedback comprises a ranking of the precoders in the first set in terms of quality.

17. The first radio node of claim 15, wherein the CSI feedback indicates a suggested second set of precoders as a basis for said precoder indicator.

18. The first radio node of claim 14, wherein the first and second data transmissions are uplink data transmissions enabling a network node to perform quality measurements on the first data transmission as a basis for said precoder indicator.

19. The first radio node of claim 14, wherein the precoder indicator indicates one or more PRGs (Precoder Resource Groups) or sub-bands for the first set of precoders used in the first data transmission.

20. The first radio node of claim 14, wherein the first radio node is configured to cycle the precoders in the first set over a set of sub-carriers used in the first data transmission so that each precoder is used for communicating the data in at least one respective sub-carrier.

21. The first radio node of claim 20, wherein the precoder indicator is based on quality of said sub-carriers.

22. The first radio node of claim 14, wherein the precoder indicator comprises a reference to a tree structure with available precoders, the tree structure comprising parent nodes and at least two child nodes connected to each parent node.

23. The first radio node of claim 22, wherein the precoder indicator comprises a reference to one of the parent nodes indicating that precoders situated under the referenced parent node shall be used when communicating the second data transmission.

24. The first radio node of claim 14, wherein the first data transmission is divided into at least two code blocks and the first radio node is configured to use corresponding subsets of the first set of precoders when communicating the at least two code blocks in the first data transmission.

25. The first radio node of claim 24, wherein the first and second data transmissions are downlink data transmissions, and wherein the first radio node is configured to communicate, with the second radio node, Channel State Information (CSI) feedback based on quality measurements on the first data transmission as a basis for said precoder indicator, and wherein the CSI feedback indicates that at least one of said code blocks were received with better quality than the other code block(s).

26. The first radio node of claim 14, wherein the first radio node is configured to repeat said communications at least once by using the second set of precoders as a new first set of precoders for communicating with the second radio node a new first data transmission.

27. A non-transitory computer-readable medium comprising, stored thereupon, a computer program comprising instructions that, when executed on at least one processor of a first radio node in a wireless network, cause the at least one processor to control the first radio node to:
communicate, with a second radio node, a first data transmission using a first set of precoders;
communicate, with the second radio node, a precoder indicator that is based on quality of the communicated first data transmission;
identify a second set of precoders within the first set, based on the communicated precoder indicator; and
communicate, with the second radio node, a second data transmission using the second set of precoders.

* * * * *